March 31, 1970 P. E. SEABORN 3,503,501
METHOD OF AND DEVICE FOR DETECTING CRACKS IN EGGS
Filed Oct. 26, 1967 6 Sheets-Sheet 1
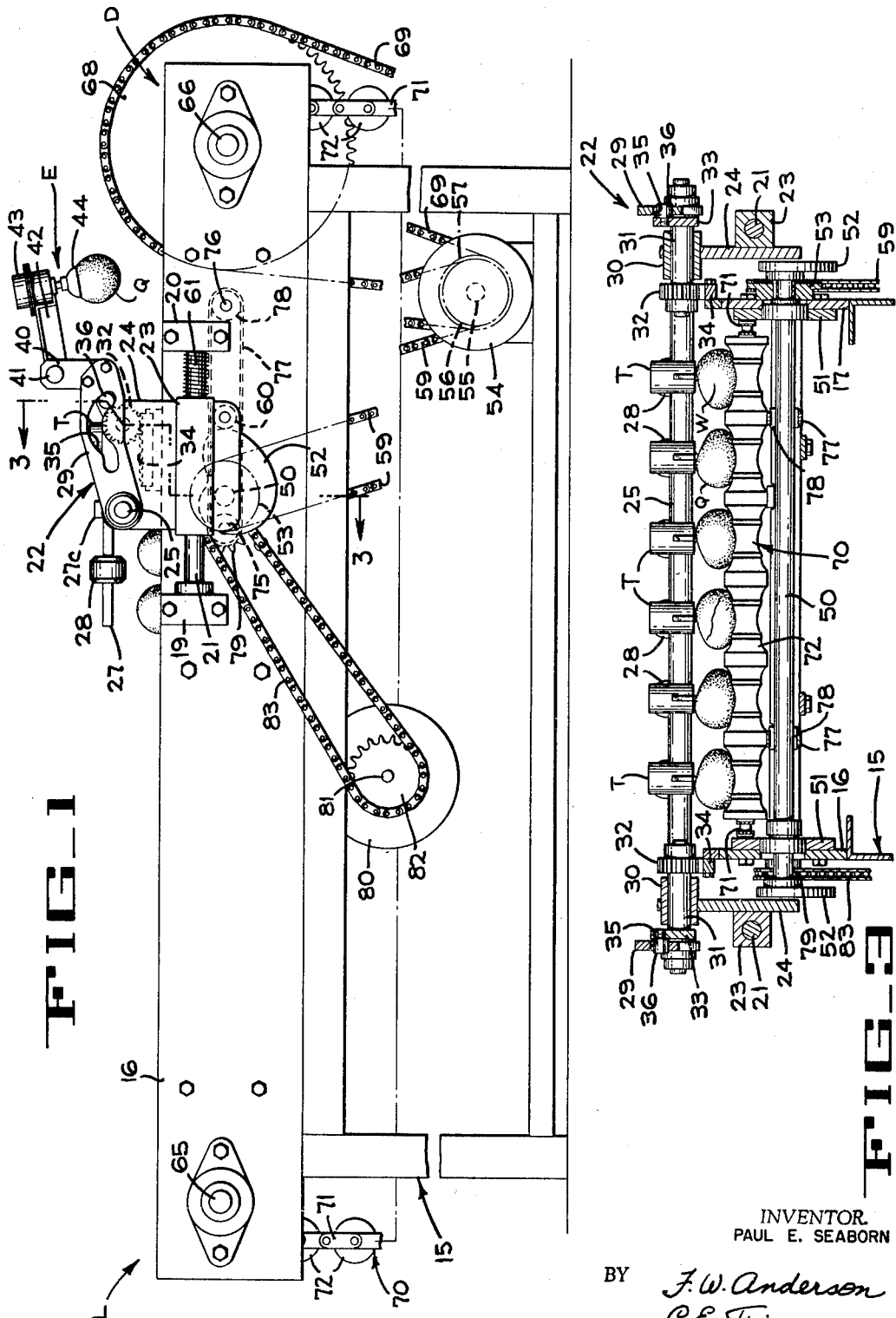
INVENTOR.
PAUL E. SEABORN
BY F. W. Anderson
C. E. Tripp
ATTORNEYS

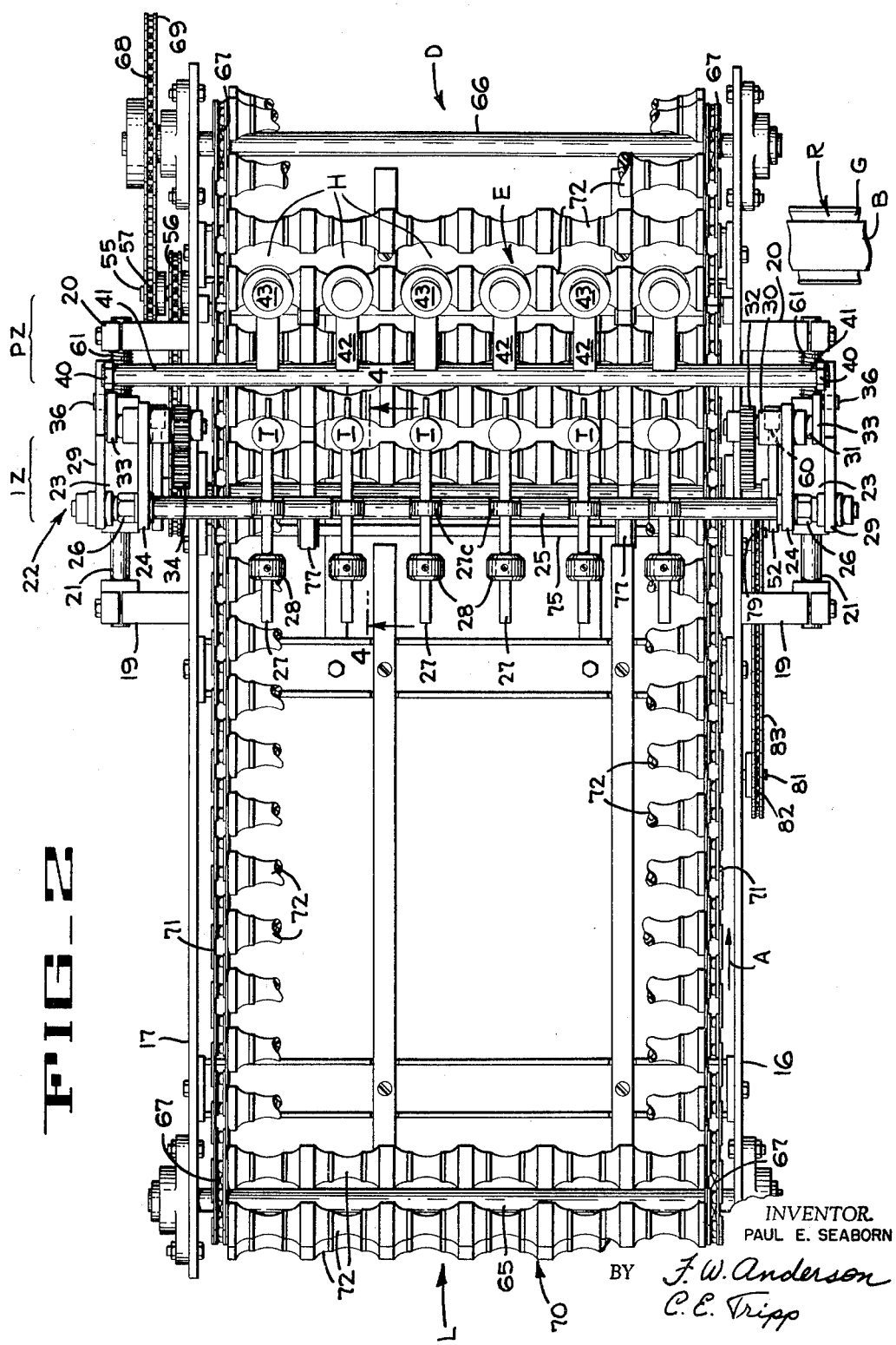

March 31, 1970 P. E. SEABORN 3,503,501
METHOD OF AND DEVICE FOR DETECTING CRACKS IN EGGS
Filed Oct. 26, 1967 6 Sheets-Sheet 3
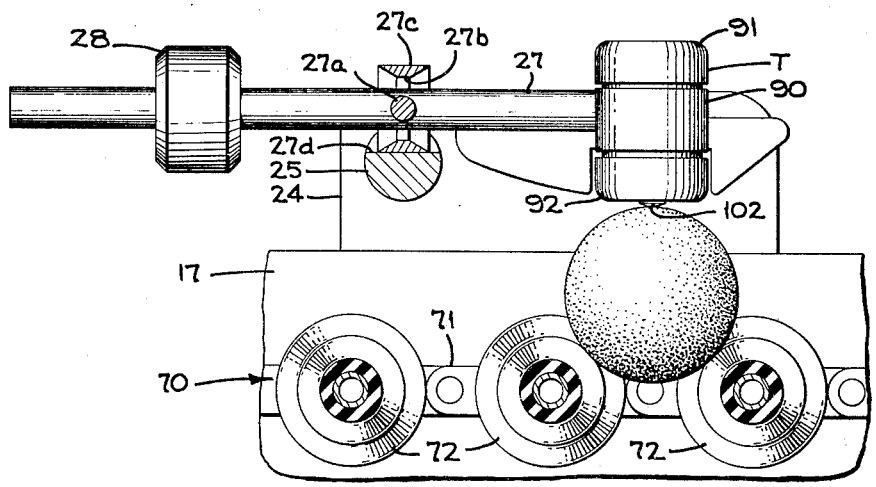
FIG_4
FIG_5
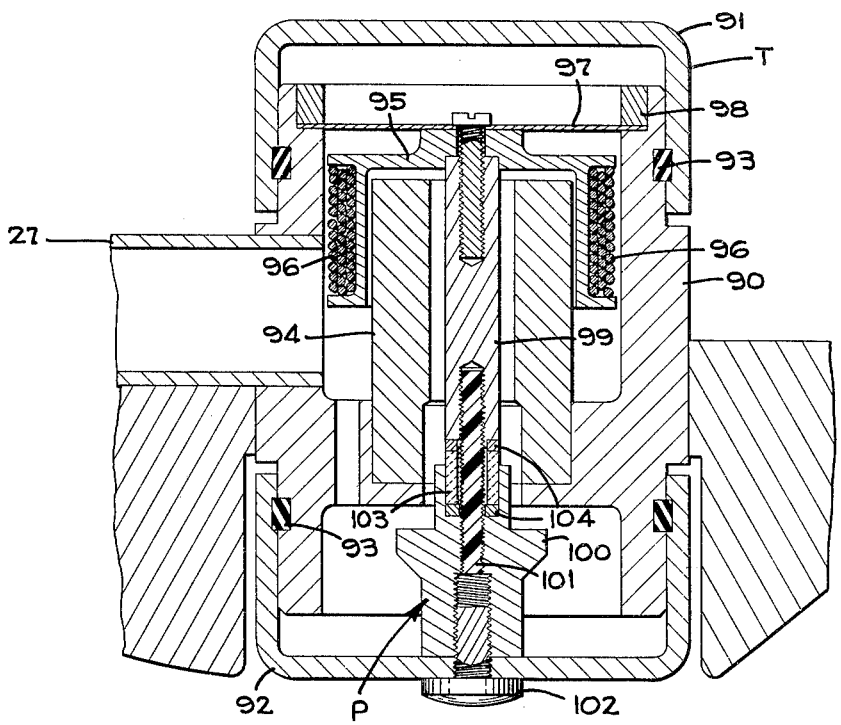
INVENTOR.
PAUL E. SEABORN
BY F. W. Anderson
C. E. Tripp
ATTORNEYS

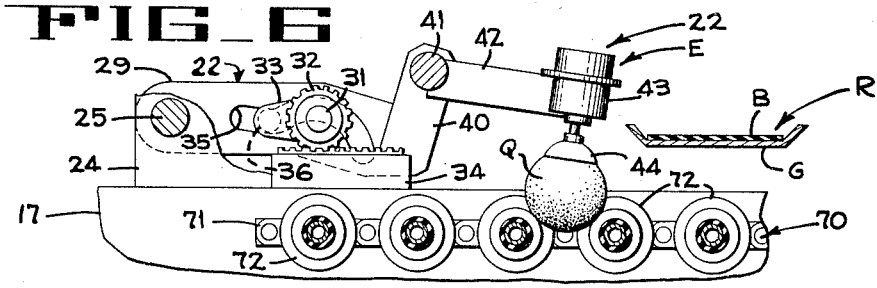
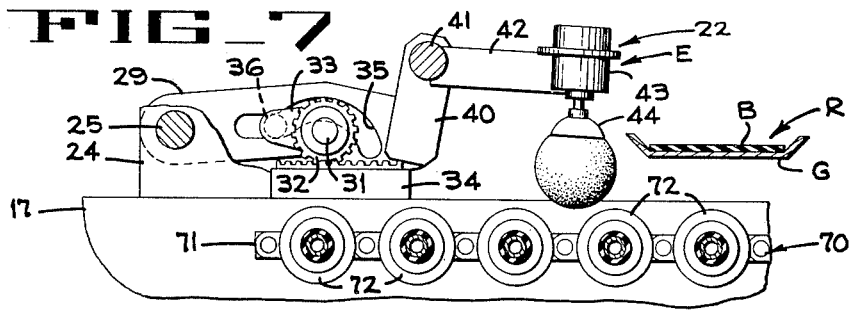
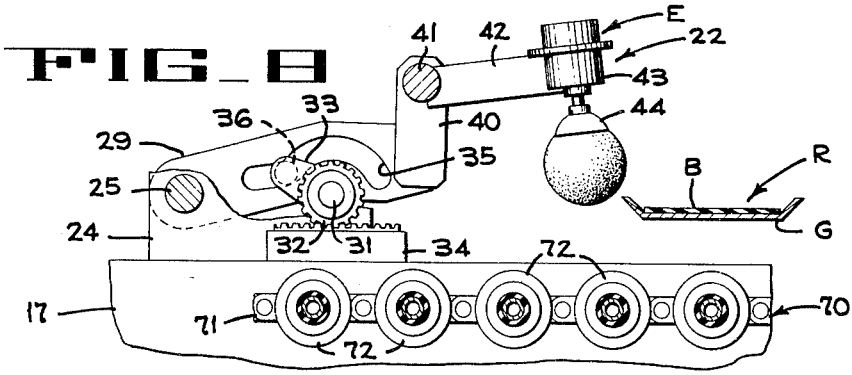
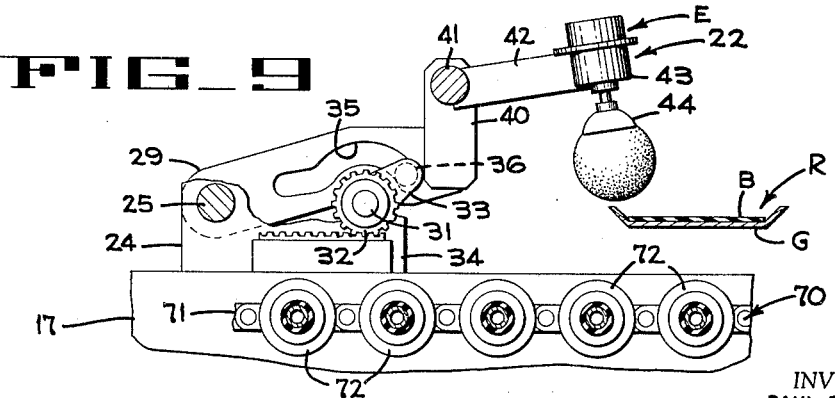

March 31, 1970   P. E. SEABORN   3,503,501
METHOD OF AND DEVICE FOR DETECTING CRACKS IN EGGS
Filed Oct. 26, 1967   6 Sheets-Sheet 5
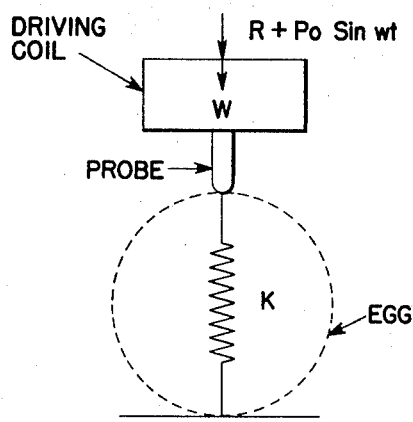
FIG_10
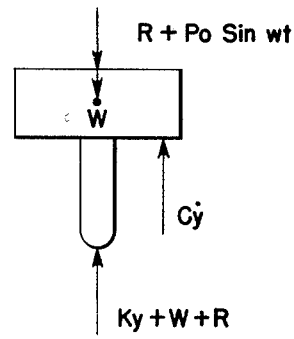
FIG_11
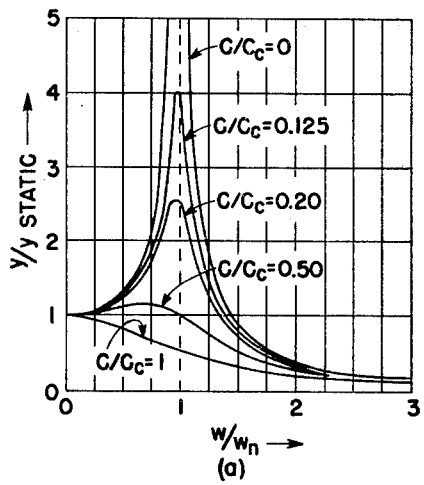
FIG_12
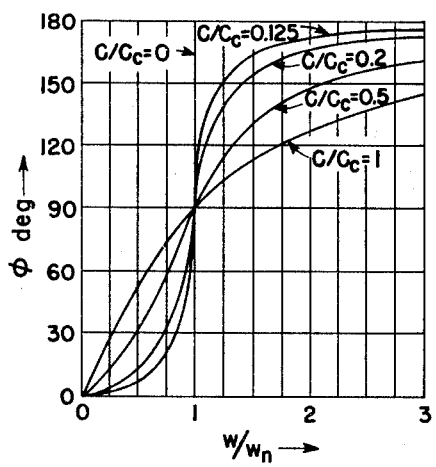
FIG_13
INVENTOR.
PAUL E. SEABORN
BY J. W. Anderson
C. E. Tripp
ATTORNEYS

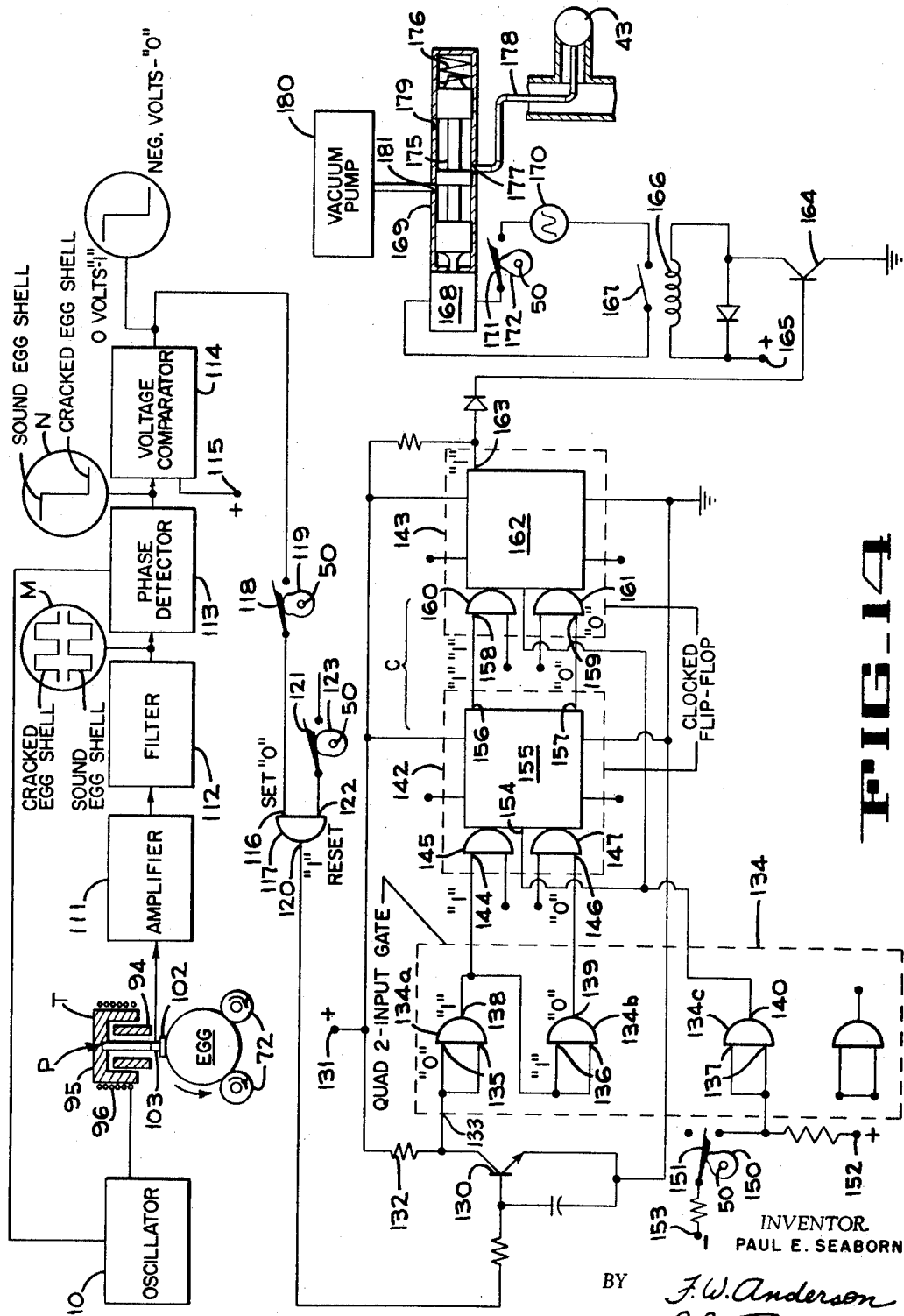

United States Patent Office 3,503,501
Patented Mar. 31, 1970

3,503,501
METHOD OF AND DEVICE FOR DETECTING CRACKS IN EGGS
Paul E. Seaborn, Los Gatos, Calif., assignor to FMC Corporation, San Jose, Calif., a corporation of Delaware
Filed Oct. 26, 1967, Ser. No. 678,285
Int. Cl. B07c 5/34; G01m 7/00; G01n 29/04
U.S. Cl. 209—111.9         25 Claims

ABSTRACT OF THE DISCLOSURE

A device for detecting cracks in eggs has a conveyor with rows of cradles which carry rotating eggs through an inspection zone. A reciprocating carriage, which moves in the inspection zone parallel to the conveyor, has a row of probes to engage, successively, successive moving rows of rotating eggs on successive strokes of the carriage. Each probe is continuously vibrated by an oscillator at a frequency below the natural frequency of a sound egg shell section but above the natural frequency of a cracked egg shell section. Each probe has a piezoelectric element therein which senses the force between the probe and the egg shell. The phase difference between the vibration induced in the probe and the vibratory reaction force between the probe and the egg shell indicates whether the egg shell is cracked. An egg ejector operates in response to the phase difference indicative of a cracked egg shell to reject the egg.

BACKGROUND OF THE INVENTION

The present invention relates to the inspection of eggs for the detection of cracked egg shells.

The shell of the chicken egg forms a natural barrier against the entrance of microorganisms into the egg. If this barrier is broken down by the fracture of the shell, this protection is lost. Serious human diseases have reportedly been traced to cracked chicken eggs and, consequently, a cracked egg shell will render an egg commercially unacceptable. It is desirable, therefore, to detect and reject eggs with cracked shells before the eggs are packaged. Manual inspection is tedious, costly, and subject to the fallibility of human operators.

SUMMARY OF THE INVENTION

In the present invention, an improved method and apparatus for automatically inspecting eggs for cracked shells is provided. In brief, in the preferred form of the invention, a conveyor has successive rows of cradles which rotate the eggs as they are carried through an inspection zone. A reciprocating carriage in the inspection zone has a row of independently suspended transducers with probes. The probes engage a moving row of rotating eggs on each stroke of the carriage. On successive strokes of the carriage, successive moving rows of rotating eggs are engaged by the row of transducer probes mounted on the carriage.

Each transducer receives energy from an electric oscillator to vibrate the probe at a frequency below the natural frequency of a sound, or uncracked, egg shell but above the natural frequency of a cracked egg shell. Each probe has a piezoelectric element therein which senses the reactionary force between the probe and the egg shell and produces a fluctuating signal corresponding to the vibration of the egg. The sensing probe and egg shell can be considered as a system subjected to external vibration. In the system, the sensing probe and egg shell act as a mass and a spring. The phase difference between the external vibration and the force between the probe and the egg shell will depend on the frequency of the external vibration and the natural frequency of the egg shell. When the probe is driven by an external vibration having a frequency below the natural frequency of the sound shell, but above the natural frequency of a cracked egg shell section, the phase shift occurring when a cracked egg, instead of a sound egg, is felt by the probe is almost 180°. This marked phase shift constitutes a positive signal which is readily detected to initiate the operation of an egg ejector to remove an egg with a cracked shell.

It is therefore one object of the present invention to provide an improved method and apparatus for detecting cracked egg shells in which a clear, positive signal is generated when a cracked egg shell is detected. It is yet another object of the present inventon to provide an improved method and apparatus for detecting cracked egg shells in which a cracked egg shell is indicated by an electrical phase shift.

BRIEF DESCRIPTION OF THE DRAWINGS

FIGURE 1 is a side view in elevation of the device of the present invention;

FIGURE 2 is a plan view of the machine of FIGURE 1;

FIGURE 3 is a view taken on the line 3—3 of FIGURE 1;

FIGURE 4 is an enlarged view taken on the line 4—4 of FIGURE 2;

FIGURE 5 is an enlarged view in cross section of one of the transducers and the probe thereof;

FIGURES 6, 7, 8 and 9 are views of a pickup head in four different positions as it moves an egg with a cracked shell from the egg conveyor to the reject conveyor;

FIGURE 10 is a schematic diagram of the spring massdamped system defined by the probe (with driving coil) and egg shell;

FIGURE 11 shows the forces acting on the probe and the driving coil of FIGURE 6;

FIGURE 12 is a plot of the displacement ratio of the egg shell plotted against the circular frequency ratio of the probe;

FIGURE 13 is a plot showing the phase angle between the applied force and displacement plotted against the circular frequency ratio; and FIGURE 14 is a schematic diagram of the electrical system of the machine of FIGURE 1.

DESCRIPTION OF THE PREFERRED EMBODIMENT

There is shown in FIGURES 1 and 2, a machine constructed in accordance with the present invention. The machine has a frame 15 and has side plates 16 and 17 secured to the frame. Each side plate has a pair of spaced brackets 19, 20 extending therefrom to receive a shaft 21 therebetween. The shafts 21 define ways to slidably receive a carriage 22.

The carriage 22 has, on each side, a slide block 23 received on shaft 21 and a side plate 24 connected to the slide block. The carriage has a rod 25, extending across the carriage and through the side plates 24, which is secured to the side plates 24 by nuts 26. A plurality of arms 27 each have a transducer T at one end and a counterweight 28 at the opposite end. As shown best in FIGURE 4, each arm 27 is pivotally connected, between the transducer and the counterweight, by a pin 27a in an oversize opening 27b extending through a support block 27c. Each support block 27c is secured on a flat 27d milled in the carriage cross shaft 25. A cam plate 29 (see FIGURE 1) is rotatably received on each end of rod 25. As shown best in FIGURE 3, a bushing 30 is secured in each side plate 24 and rotatably receives a stub shaft 31 therein. The inboard end of each stub shaft 31 has a pinion 32 secured thereon and the outboard end of the shaft 31 has a crank 33 thereon. The pinions 32 are engaged with racks 34 mounted, respectively, on side plates 16 and 17 of frame 15. The outer end of each crank 33 has a crank pin 36 received in slot 35 of cam plate 29. Thus, any movement of carriage 22 with respect to frame 15 will cause rotation of shaft 31, by virtue of the rack and pinion, and will thus cause movement of cam plates 29 depending on the position of the crank pin in the slot 35. As shown best in FIGURE 1, the outer, or free, end of each cam plate 29 has an upstanding bracket 40 secured thereto. The brackets 40 tightly receive the opposite ends of a shaft 41 extending across the carriage. Spaced arms 42 secured to shaft 41 extend outwardly therefrom and carry at their outer end a pickup head 43. The pickup head 43 has a depending cup 44 which, when suction is applied thereto, will pick up an egg Q contacted by the cup.

As shown best in FIGURE 3, a shaft 50 is journaled in plates 51 which are connected, respectively, to side plates 16 and 17 of the frame. The shaft 50 extends through the side plates 16 and 17 and has a cam 52 connected thereto at each end outboard of each frame side plate. A sprocket 53 is secured on shaft 50 between side plate 17 and cam 52. An electric motor 54 (FIGURE 1) mounted in the frame has a drive shaft 55 (FIGURE 2) with two sprockets 56, 57 thereon. The shaft 50 is rotated by motor 54 through a chain 59 received on sprocket 53 and sprocket 56. A follower roller 60 is mounted on each carriage side plate 24 for registration with cam 52. A spring 61 on each of the shafts 21 which support the carriage urges the follower 60 on the carriage into continuous engagement with the cam 52. As the cam 52 rotates (clockwise as viewed in FIGURE 1) the carriage is moved from the extreme left hand position on shaft 21 to the right, and then rapidly returned to the left by spring 61.

Two cross shafts 65, 66 are journaled, respectively, in opposite ends of the frame and each has sprockets 67 mounted inboard of the frame side plates 16 and 17. In addition, shaft 66 has sprocket 68 mounted thereon outboard of side plate 17. Sprocket 68 is rotated, to rotate shaft 66, by motor 54 through chain 69 received on sprockets 57 and 68. Two additional cross shafts (not shown) are journaled in the frame below shafts 65, 66 and each has sprockets in registration with the sprockets 67 on shafts 65, 66. An endless conveyor, indicated generally at 70, has, on each side, an endless chain 71 which is received on the sprockets 67 of the four cross shafts (65, 66, and the two shafts, not shown, below shafts 65, 66). The conveyor is driven in the direction indicated by arrow A by rotation of shaft 66. The conveyor 70 has a plurality of closely spaced, parallel, rollers 72 rotatably connected, at each end, to the chains 71. The rollers are contoured, with varying diameters, so that every two adjacent rollers define a row of cradles H to receive a row of eggs. Thus, the top run of the conveyor (extending between cross shafts 65, 66) carries a plurality of rows of eggs from a loading station L at the downstream end of the machine, through an inspection zone IZ under the carriage 22, to a delivery station D at the upstream end of the machine.

Two spaced shafts 75, 76 are journaled in the frame below the top run of the conveyor. Endless belts 77, mounted on pulleys 78 on the shafts 75, 76, extend between the shafts 75, 76 in engagement with the rollers 72 of conveyor 70 which are passing under the carriage 22. Shaft 75 has sprocket 79 mounted thereon outboard of side plate 16. A motor 80 has a drive shaft 81 with sprocket 82 thereon. The belts 77 are driven by the motor 80 through chain 83 received on sprockets 79 and 82. Thus, as the conveyor rollers 72 reach the carriage 22, the rollers are spun by the belts 77 to rotate the eggs as they pass under the carriage.

The conveyor 70, which is driven by the same motor 54 reciprocating the carriage 22, moves continuously in timed relation to the reciprocation of the carriage. The rows of eggs (omitted from FIGURE 2 for clarity) move into registration with the transducers T, which are mounted on the carriage, when the carriage 22 is in the left (FIGURE 1), or downstream, position. The transducers, when not contacting an egg, hang down into the paths of the eggs. The counterbalanced transducers, which are mounted on pivot arms 27, yield on contact with an egg and ride over the upper surface of the egg. The moment the rotating eggs contact the transducers, the carriage 22 moves to the right, under the influence of cams 52, at the same speed the eggs are moved by the conveyor 70. Thus each egg, as it rotates, remains in contact with one of the transducers T for at least one full revolution of the egg so that a crack, if present, will come under the probe. It should be noted that most cracks which occur in egg shells appear at the waist W, or largest diameter, of the egg. As the eggs leave the inspection zone IZ, which extends between the extreme limits of movement of the transducers, they pass into a pickup zone PZ, defined by the limits of movement of the pickup heads 43, which are also mounted on the carriage 22.

When the carriage 22 is in the extreme rear, or upstream, position as shown in FIGURE 6, the crank 33 is in its extreme counterclockwise position (as viewed in FIGURE 6), lowering the cam plate 29, and thus the brackets 40, shaft 41, arms 42, and pickup heads 43. In this position of the carriage 22 with respect to the frame 15, the pickup cups 44 are engaged with a row of eggs. Although each egg is engaged by a pickup cup, which is aligned with and downstream from the transducer T which previously contacted the egg, suction is applied to the pickup cups only if the transducer sensed a crack in the egg shell. As the carriage 22 advances on the frame, the crank 33 rotates clockwise (as viewed in FIGURE 7) and the pickup heads begin to rise, as shown in FIGURE 7. If suction has been applied to the pickup cup, the egg will be elevated with the cup; if no suction is applied to the cup, the egg will remain in the conveyor cradle H. When the carriage reaches the position on the frame shown in FIGURE 8, the pickup head is fully elevated, and remains elevated to the end of the stroke of the carriage on the frame, as shown in FIGURE 9. As the carriage 22 approaches the end of its forward, or downstream, travel, the pickup head moves over a conveyor R, having a movable belt B supported by a guide plate G. The conveyor R, which crosses the conveyor 70 above the eggs, receives cracked eggs dropped by the pickup heads 43 for removal thereof. As the carriage is returned to the rear, or upstream, position on the frame, the crank rotates counterclockwise and the pickup heads descend to contact the next row of eggs.

As shown in FIGURE 5, each transducer T has a casing 90 tightly received in pivot arm 27. An upper cover 91 and lower cover 92 are received on the casing and held thereon in sealing relation by O-rings 93. A hollow cylindrical permanent magnet 94 is tightly received in the casing 90. A cup shaped spool 95, carrying a coil of wire 96, is suspended over the magnet by a spring 97 which is clamped in the casing by ring 98. The coil 96 is positioned in the field of flux emanating from the magnet so that when oscillating current is supplied to the coil, the spool 95 will vibrate. A rod 99 is connected centrally to spool 95 and extends downwardly therefrom through magnet 94. A foot member 100 is connected by a nylon stud 101 to the lower end of rod 99. The foot member is secured to the lower cover by a button 102 extending through the cover and secured in the foot member. A piezoelectric element 103 sandwiched between insulating washers 104, is compressed between the foot member 100 and the rod 99. As a fluctuating, or vibrating, driving force is applied to rod 99 or button 102, the load imposed on the piezoelectric element (which is a ceramic tube constituting an electromechanical pressure sensitive element) by stud 101 fluctuates in accordance with the force to produce a fluctuating electrical signal corresponding, at any instant, to the force exerted between the button 102 and the rod 99. The button 102 is resiliently mounted in the cover 92 and the rod is resiliently mounted by spring 97. Thus, the signal produced by the element 103 will depend both on the force produced on rod 99 and the force produced on button 102.

When the ends of coil 96 are connected to a driving oscillator, vibrations are induced in the rod 99. If the elements suspended by the flexible spring 97 and cover 92 (that is, button 102, stud 101, element 103, foot member 100, rod 99, spool 95, and coil 96) be considered a sensing probe P, the egg shell and the sensing probe when in mutual contact can be considered as a spring mass-damped system excited by external vibration. FIGURE 10 is a schematic diagram of the system.

From the diagram it can be seen that the egg shell acts as a pure spring, and the probe a mass. It has been found experimentally that the egg shell mass is small with respect to the total moving mass. Damping in the system is also small.

The following are the equations of motion which govern the behavior of a spring mass-damped system when excited by an external forced vibration, as shown in FIGURE 11:

$R + P_o \sin wt + W - C\dot{y} - Ky - W - R - m\ddot{y} = 0$
$m\ddot{y} + C\dot{y} + Ky = P_o \sin wt$ where R = Load—grams
$P_o$ = Load—gams
w = Driving circular frequency—rad./sec.
$w_n$ = Natural circular frequency—rad./sec.

$$W_n = \sqrt{\frac{k}{m}}$$

W = Probe weight—grams
C = Damping coefficient—gr./cm./sec.
$C_c$ = Critical damping coefficient—gr./cm./sec.
K = Spring rate—gr./cm.
y = Displacement—cm.
$\dot{y}$ = Velocity—cm./sec.
$\ddot{y}$ = Acceleration—cm./sec.$^2$
t = Time—sec.
g = Gravitational constant—cm./sec.$^2$ $$m = \text{Mass} - \frac{W}{g} - \frac{\text{gr.} - \text{sec.}^2}{\text{cm.}}$$

$\phi$ = Phase angle—rad.

The solution of this equation is classic and can be presented in the form:

$y = y_o \sin (wt - \phi)$ $$y_o = \frac{\frac{P_o}{K}}{\sqrt{\left(1 - \frac{w^2}{w_n^2}\right)^2 + \left(2\frac{C}{C_c} \cdot \frac{w}{w_n}\right)^2}}$$

$$\tan \phi = \frac{2\frac{C}{C_c}\frac{w}{w_n}}{1 - \left(\frac{w}{w_n}\right)^2}$$

The equations of motion indicate that for zero damping the displacements would go to infinity if the mass were driven at a circular frequency equal to the natural circular frequency. In actual practice sufficient dampening and nonlinearity exists to prevent this destructive action. FIGURE 12 is a plot of the displacement ratio (y/y static with y static—$P_o/K$) plotted against the circular frequency ratio (driving frequency divided by the natural frequency).

FIGURE 13 is the phase plot, showing the phase angle relationship between the applied force and the displacement as a function of the ratio of circular frequencies. If the damping ratio is equal to zero, it can be seen that with a circular frequency ratio less than one the phase angle is zero; the driving force and the displacement are in phase. With zero damping if the circular frequency ratio exceeds one, the phase shifts immediately to 180 degrees, indicating that the driving force and displacement are out of phase. As damping is added this step function is reduced to more of a S curve.

The proposed solution to the problem of detecting cracks in egg shells is to drive the probe at a frequency which has a circular frequency ratio such that the good section of the egg will lie below the $w/w_n = 1$ point, ($w/w_n < 1$) and the cracked eggs will lie above the $w/w_n = 1$ point ($w/w_n > 1$). When a crack is under the probe (or within about ⅛ inch of the probe), nearly a 180° phase shift will take place. Test data indicates that with the probe mass used, the natural frequency of the whole egg shell (an uncracked egg) is approximately 800 cycles per second (depending upon egg size and thickness of the shell). A cracked shell exhibits a natural frequency of 400 cycles per second in the area of the crack. The natural frequency in the area of the crack depends somewhat on the size of the crack and its location with respect to the probe. With a frequency ratio of two (800 cycles per second against 400 cycles per second) this indicates that the spring rate of the cracked egg change by a factor of four, since the natural frequency is a function of the square root of the spring rate ($w = \sqrt{K/m}$).

With a driving frequency of 600 cycles per second, the frequency ratio of a cracked egg will change from 0.75 to 1.5. With the small amount of damping present, nearly 180° of phase shift takes place.

A phase shift measurement is preferable over an amplitude measurement since it is less susceptible to noise generated by surface roughness.

It will be noted from FIGURE 2 that each transducer T has in registration therewith a vacuum head and cup which operates as an ejector mechanism E to reject an egg which the transducer T indicates has a cracked shell. A circuit for operating each ejector mechanism E in response to the particular transducer T in registration therewith is shown in FIGURE 14.

As shown in FIGURE 14, an oscillator 110, operating continuously at a fixed frequency of 600 cycles per second, is connected to the coil 96 of each transducer T. By virtue of the oscillator 110 and magnet 94, the coil 96 may be considered an electro-mechanical vibrator connected to the probe rod to produce oscillations therein. The equations of motion indicate that the output frequency of each transducer will be the same (that is, 600 cycles per second) as the input frequency, but the phase will differ. The piezoelectric element 103, which generates the output voltage of the transducer, is electrically connected to the input of an amplifier 111. The output of amplifier 111 is connected to the input of filter 112, which is tuned to 600 cycles per second, to pass the signal at the frequency but to block noise signals at other frequencies. As indicated at M in FIGURE 14, the phase of the signal produced by the transducer and passed through the amplifier 111 and filter 112 for a cracked egg shell will be shifted substantially 180 degrees from the phase of a signal produced by a sound egg shell. The output of the filter is connected to the input of a phase detector 113 which produces an output signal indicative of the phase of the input signal supplied thereto, as indicated at N in FIGURE 14. This signal is fed to a comparator circuit 114 (such as Fairchild linear integrated circuit μA710G) which compares the voltage input to a reference voltage 115. The output of circuit 114 will be at a negative voltage (that is, at a low voltage which may, for convenience, be referred to as "0" in logic symbols) for a cracked egg shell and will rise to zero volts (that is, a higher voltage which may be indicated as "1" in logic symbols) for a sound egg. Where a single logic symbol is indicated at a terminal of a logic circuit in FIGURE 14, the symbol will indicate the condition of the circuit when a cracked egg shell is detected.

The output of comparator circuit 114 is fed to the set terminal 116 of flip-flop circuit 117 through switch 118. Switch 118 is operated by a cam 119 mounted on cam shaft 50. The cam 119, which is coordinated with reciprocation of the carriage and movement of the conveyor, allows switch 118 to close only after the transducer T is in contact with an egg. The switch 118 will open before the transducer T leaves the egg. If the transducer is in contact with a sound egg (or if the switch 118 is open as when no egg is under the transducer) zero volts ("1") will be impressed on the input set terminal 116 of flip-flop 117. A low voltage ("0") will appear at the output terminal 120. When a crack is detected in an egg shell, the voltage signal at input set terminal 116 will drop to "0" and the voltage at output terminal 120 will rise to "1." As the egg rotates, and the crack moves out from under the transducer to present a sound shell section to the transducer, the voltage at input terminal 116 will rise to "1." However, the voltage at output terminal 120 will remain at "1" until a negative pulse is received at reset input terminal 122. On each revolution of cam shaft 50 and each revolution of cam 123 (that is, on each reciprocating cycle of the carriage) the switch 121 is closed momentarily (just after switch 118 closes) by cam 123 and then immediately reopens. Closing of switch 121 resets the voltage at output terminal 120 to the low state ("0").

The presence of a high signal ("1") at output terminal 120 of flip-flop circuit 117 impresses a voltage at the base of transistor 130 which produces a current flow from source 131 through resistor 132 to ground. This drops the voltage (to "0") input terminal 133 of quad 2-input gates 134 (which may, for example, be Motorola quad 2-input gate MC846F). Only three gates 134a, 134b, and 134c of unit 134 are utilized. Each of these gates has two input terminals which are connected together, and thus may be considered a single input terminal designated, respectively, 135, 136 and 137. Each gate acts as an inverter, and the voltage at the output terminals (designated 138, 139, 140) of the gates will be opposite the voltages at the respective input terminals. Thus, with a "0" signal at input terminal 135, a "1" voltage appears at output terminal 138.

Clocked flip-flop circuit 142, and a second clocked flip-flop circuit 143 (which may, for example, be Motorola clocked flip-flop circuit MC845F) each have two input gates and a shift register. Only one input terminal of each input gate is used, and the output of each input gate is fed to the shift register. Each shift register has, in addition to ground and biasing terminals, one signal input terminal and two signal output terminals.

The output signal at terminal 138 of gate 134a ("1" when a crack is detected in the shell of an egg) simultaneously appears at the input terminal 136 of gate 134b and at the input terminal 144 of gate 145 of circuit 142. Thus, a "0" output will appear at output terminal 139 of gate 134b which is simultaneously impressed on input terminal 146 of gate 147 of circuit 142.

It will be appreciated that signals "1" and "0" appear at terminals 144 and 146, respectively, the instant a crack is detected in the shell of an egg. However, the ejector mechanism E, which is spaced downstream from the transducer detector to avoid interference therewith, cannot be actuated instantly. Instead, the signal for actuating the ejector must be delayed until the cracked egg reaches the ejector mechanism, which is located a distance equal to twice the pitch of the conveyor (that is, twice the distance between the axes of the adjacent rollers 72) downstream from the ejector mechanism.

The clocked flip-flops 142 and 143 define a timer, indicated generally as C, which delays the signal from the transducer so that it will reach the ejector mechanism for actuation thereof when the cracked egg has traveled two pitch lengths of the conveyor to reach the ejector.

A cam 150, mounted on cam shaft 50, closes switch 151 once on each rotation of shaft 50 (that is, once on each reciprocation of carriage 22). The switch 151 closes as the transducer leaves one egg and remains closed as the carriage shifts upstream to bring the transducer into contact with the next egg, at which time the switch 151 opens. The input terminals 137 are biased by source 152 to a high (or +) voltage when the switch is open, but are connected to negative source 153 when the switch 151 closes. Closing of switch 151 therefore lowers the voltage at input terminals 137 of gate 134c, raises the voltage at output terminal 140 of gate 134c, and raises the voltage at input terminal 154 of shift register 155. When the voltage signal defined by the rise in voltage is impressed on terminal 154, the signals in gates 145 and 147 ("1" and "0" respectively if the last egg detected was cracked) are shifted to output terminals 156, 157 respectively. At this time, the gates 145, 147 can receive another set of signals corresponding to the condition of the next egg.

The voltage at output terminals 156, 157 appear at input terminals 158, 159 of gates 160, 161 of clocked flip-flop 143. The voltage from gate 158 is transferred through the shift register 162 to output terminal 163 thereof when switch 151 again closes at the next reciprocating stroke of the carriage. Since the conveyor advances one pitch for each reciprocating stroke of the carriage, the cracked egg will, at this time, be at the ejector E with the cup 44 of the ejector in contact with the egg. The voltage signal at terminal 163 produces a signal at the base of transistor 164 which produces a current flow from source 165, through relay coil 166, to ground. Current through relay coil 166 closes relay switch 167 to connect solenoid 168 of valve 169 across energy source 170. At this time switch 171, which is operated by cam 172 mounted on cam shaft 50, is closed.

Valve 169 has a valve member 175 shiftable to the right (from the position shown in FIGURE 14) by energization of solenoid 168 and shiftable to the left, on deenergization of solenoid 168, by spring 176. When the valve member 175 is in the left hand position, as shown, the pickup head 43, which is connected to valve port 177 by line 178, is in communication through port 179 with the atmosphere. When the solenoid 168 is energized and valve member 175 is shifted to the right because of the presence of a cracked egg, the pickup head 43 is in communication with vacuum pump 180 which is connected to port 181 of valve 169. The vacuum pump produces suction in the pickup head which holds an egg to the cup 44. The pickup head then rises, lifting the cracked egg off the conveyor 70, and moving it over the reject conveyor R. At that instant switch 171 opens, deenergizing solenoid 168, to connect the pickup head to atmosphere. This releases the egg which drops onto the reject conveyor.

When the detector T encounters a sound egg a low "0" voltage signal is stepped through the clocked flip-flop 142, 143 to output terminal 163. A "0" voltage at output terminal 163 will not actuate transistor 164 and hence no current flow will occur through coil 166. Thus, switch 167 will remain open and solenoid 168 will not be energized. Thus, pickup head 43 will not be connected to vacuum pump 180. Therefore, although the pickup cup 44 will contact the egg as the carriage moves through its reciprocating cycle, the egg will not be picked up by the cup.

Having completed a detailed description of the invention so that those skilled in the art could practice the same, I claim:

1. The method of detecting cracks in egg shells comprising the steps of
 (a) engaging the shell of the egg with a probe,
 (b) applying a vibrating driving force to the probe,
 (c) sensing the force between the probe and the egg shell, and (d) comparing the driving force and the force between the probe and the egg shell to detect a crack in the egg shell.

2. The method of culling cracked eggs from sound eggs comprising the steps of
(a) engaging successively the shells of the eggs with a probe,
(b) applying a vibrating driving force to the probe,
(c) sensing the force between the probe and each egg shell,
(d) comparing the driving force and the force between the probe and each egg shell to determine the soundness of each egg shell, and
(e) removing eggs with cracked egg shells.

3. The method of detecting cracks in egg shells comprising the steps of
(a) rotating the egg,
(b) engaging the shell of the egg with a probe as the egg rotates,
(c) applying a vibrating driving force to the probe,
(d) sensing the reactionary force between the probe and the egg shell, and
(e) comparing the driving force and the force between the probe and the egg shell during a revolution of the egg to detect a crack in the egg shell.

4. The method of culling cracked eggs from sound eggs comprising the steps of
(a) rotating the eggs,
(b) engaging successively the shells of the eggs with a probe as the eggs rotate,
(c) applying a vibrating driving force to the probe,
(d) sensing the force between the probe and each egg shell,
(e) comparing the driving force and the force between the probe and each egg shell during a revolution of the egg to detect a crack in the egg shell, and
(f) removing the eggs with cracked shells.

5. The method of detecting cracks in egg shells comprising the steps of
(a) engaging the shell of the egg with a probe,
(b) applying to the probe a vibrating force below the natural frequency of a sound egg shell but above the natural frequency of a cracked egg shell,
(c) sensing the vibration of the egg shell, and
(d) measuring the phase difference between the vibrating force applied to the probe and the vibration of the egg shell to determine the presence of a crack in the egg shell.

6. The method of detecting cracks in egg shells comprising the steps of
(a) engaging the shell of the egg with a probe,
(b) applying to the probe a vibrating force below the natural frequency of a sound egg shell but above the nautral frequency of a cracked egg shell,
(c) sensing the force between the probe and the egg shell, and
(d) measuring the phase difference between the vibrating force applied to the probe and the force between the probe and the egg shell to detect the presence of a crack in the egg shell.

7. The method of culling eggs with cracked shells from sound eggs comprising the steps of
(a) rotating the egg,
(b) engaging the shell of a rotating egg with a probe,
(c) applying to the probe a vibrating force below the natural frequency of a sound egg shell but above the natural frequency of a cracked egg shell,
(d) sensing the force between the probe and the egg shell,
(e) measuring the phase difference between the vibrating force applied to the probe and the force between the probe and the egg shell as the egg rotates, and
(f) removing an egg in response to a phase shift of the force between the probe and the egg shell relative to the vibrating force.

8. A device for testing the soundness of an egg shell comprising
(a) means to apply a vibrating force to the egg shell,
(b) means to sense the vibration of the egg shell, and
(c) means to measure the phase relationship between the vibrating force and the vibration of the egg shell.

9. The mechanism of claim 8 including means responsive to the phase relationship between said vibrating force and the vibration of the egg shell to indicate an egg with a cracked shell.

10. The mechanism of claim 8 including means responsive to a predetermined phase relationship between said vibrating force and the vibration of the egg shell to eject an egg.

11. A device for testing the soundness of an egg shell comprising
(a) a probe to engage the egg shell,
(b) means to apply a vibrating force to the probe, and
(c) means to sense the force between the probe and the egg shell.

12. The device of claim 11 including means to compare the vibrating force and the force between the probe and the egg shell to detect a crack in the egg shell.

13. The device of claim 11 including means to measure the phase difference between the vibrating force applied to the probe and the force between the probe and the egg shell to detect the presence of a crack in the egg shell.

14. A device for testing the soundness of egg shells comprising
(a) means to rotate an egg,
(b) means to apply a vibrating force to the shell of the rotating egg,
(c) means to sense the vibration of the egg shell, and
(d) means to measure the phase relationship between said vibrating force and the vibration of the egg shell to reject an egg.

15. A device for testing the soundness of an egg shell comprising
(a) means to rotate the egg,
(b) a probe to engage the shell of the rotating egg,
(c) means to apply a vibrating force to the probe,
(d) means to sense the force between the probe and the egg shell,
(e) means to measure the phase difference between the vibrating force applied to the probe and the force between the probe and the egg shell, and
(f) means responsive to a predetermined phase difference between the vibrating force applied to the probe and the force between the probe and the egg shell to reject an egg.

16. A device for detecting cracks in egg shells comprising
(a) a probe rod to engage the egg shell,
(b) an electromechanical vibrator connected to the probe rod to produce oscillations therein, and
(c) an electromechanical pressure sensitive element mounted in the probe rod to sense the force between the probe and the egg shell to determine the vibrations of the egg shell.

17. A device for detecting cracks in egg shells comprising
(a) a probe rod to engage the egg shell,
(b) an electrical oscillator,
(c) a magnet,
(d) a coil mounted in the field of flux emanating from the magnet, said coil mechanically connected to the probe rod and electrically connected to the oscillator, and
(e) a piezoelectric element mounted in the probe rod to sense the force between the probe rod and the egg shell and produce electrical signals corresponding to the vibrations of the egg shell.

18. The device of claim 17 including a phase detector to measure the phase difference between the oscillator and the electrical signals from the piezo-electric element.

19. Apparatus for inspection of eggs for cracked shells comprising
   (a) a conveyor to carry eggs through an inspection zone,
   (b) a carriage movable with the conveyor in the inspection zone, and
   (c) a probe mounted on the carriage to engage an egg in the inspection zone.

20. Apparatus for the inspection of eggs for cracked shells comprising
   (a) a conveyor to carry rotating eggs through an inspection zone,
   (b) a reciprocating carriage adjacent the conveyor and movable with the conveyor through the inspection zone, and
   (c) a probe mounted on the carriage to engage a rotating egg while the carriage is moving with the conveyor through the inspection zone.

21. Apparatus for inspection of eggs for cracked shells comprising
   (a) a conveyor movable in a longitudinal direction, said conveyor having a series of longitudinally spaced cradles to receive eggs, said cradles operable to rotate the eggs as the eggs move through an inspection zone,
   (b) a reciprocating carriage in the inspection zone adjacent the conveyor, said carriage movable alternately with the conveyor and opposite to the conveyor through the inspection zone, and
   (c) a probe mounted on the carriage to engage seriatim the eggs in successive cradles during that part of the reciprocating cycle of the carriage that the carriage is moving with the conveyor.

22. The apparatus of claim 21 including means responsive to detection of a cracked shell by the probe to remove the egg having said cracked shell.

23. The apparatus of claim 22 including an egg ejector for each probe, each ejector operable in response to detection of a cracked shell by a probe to remove the egg having said cracked shell.

24. Apparatus for inspection of eggs for cracked shells comprising
   (a) a conveyor movable in a longitudinal direction, said conveyor having a series of longitudinally spaced rows of cradles to receive rows of eggs, said cradles operable to rotate the eggs as the eggs move through an inspection zone,
   (b) a reciprocating carriage in the inspection zone adjacent the conveyor, said carriage movable parallel to and alternately with the conveyor and oppositely to the conveyor through the inspection zone, and
   (c) a row of probes mounted on the carriage to engage seriatim the eggs in successive rows of cradles during that part of the reciprocating cycle of the carriage that the carriage is moving with the conveyor.

25. A device for detecting cracks in egg shells comprising
   (a) a probe rod to engage the egg shell,
   (b) an electrical oscillator,
   (c) a magnet,
   (d) a coil mounted in the field of flux emanating from the magnet, said coil mechanically connected to the probe rod and electrically connected to the oscillator,
   (e) a piezoelectric element mounted in the probe rod to sense the force between the probe rod and the egg shell and produce electrical signals corresponding to the vibrations of the egg shell.
   (f) a phase detector to measure the phase difference between the oscillator and the electrical signals from the piezoelectric element, and
   (g) means responsive to operation of the phase detector to reject an egg.

References Cited
UNITED STATES PATENTS

| | | | |
|---|---|---|---|
| 2,635,746 | 4/1953 | Gordon | 73—67.2 X |
| 3,067,605 | 12/1962 | Bliss. | |
| 3,240,054 | 3/1966 | Roth | 73—67.2 X |
| 3,349,604 | 10/1967 | Banks | 73—67.2 |

RICHARD A. SCHACHER, Primary Examiner

U.S. Cl. X.R.

73—67.2, 70